(12) United States Patent
Gu et al.

(10) Patent No.: US 9,333,441 B2
(45) Date of Patent: May 10, 2016

(54) SYSTEM AND METHOD FOR CONTINUOUS EXTRACTION OF MATERIAL

(75) Inventors: Junjie Gu, Hebei (CN); Juan Du, Hebei (CN)

(73) Assignee: ENN SCIENCE & TECHNOLOGY DEVELOPMENT CO., LTD., Hebei (CN)

( * ) Notice: Subject to any disclaimer, the term of this patent is extended or adjusted under 35 U.S.C. 154(b) by 805 days.

(21) Appl. No.: 13/393,171

(22) PCT Filed: Aug. 24, 2010

(86) PCT No.: PCT/CN2010/001281
§ 371 (c)(1),
(2), (4) Date: Apr. 16, 2012

(87) PCT Pub. No.: WO2011/022938
PCT Pub. Date: Mar. 3, 2011

(65) Prior Publication Data
US 2012/0251642 A1     Oct. 4, 2012

(30) Foreign Application Priority Data

Aug. 28, 2009   (CN) .......................... 2009 1 0169722

(51) Int. Cl.
*B01D 11/02*    (2006.01)
(52) U.S. Cl.
CPC .......... *B01D 11/023* (2013.01); *B01D 11/0265* (2013.01)
(58) Field of Classification Search
None
See application file for complete search history.

(56) References Cited

U.S. PATENT DOCUMENTS

| | | | | |
|---|---|---|---|---|
| 2,686,192 | A * | 8/1954 | Bonotto | 554/13 |
| 4,221,764 | A * | 9/1980 | Saxon | 422/268 |
| 4,751,060 | A * | 6/1988 | Kratochwill | 422/268 |
| 4,838,410 | A * | 6/1989 | Gough | 198/706 |
| 4,956,125 | A * | 9/1990 | Kawamata et al. | 554/10 |
| 4,981,579 | A * | 1/1991 | Paspek et al. | 208/314 |
| 5,017,281 | A * | 5/1991 | Sadeghi et al. | 208/390 |
| 5,620,728 | A * | 4/1997 | Langley et al. | 426/312 |
| 5,641,057 | A * | 6/1997 | Chorlton | 198/708 |
| 2003/0192660 | A1* | 10/2003 | Speaks et al. | 162/72 |
| 2009/0246093 | A1* | 10/2009 | Kimura | 422/159 |
| 2014/0216117 | A1* | 8/2014 | DeShazo et al. | 71/12 |

FOREIGN PATENT DOCUMENTS

| | | |
|---|---|---|
| CN | 2 401 245 | 10/2000 |
| CN | 2 582 599 | 10/2003 |

(Continued)

OTHER PUBLICATIONS

International Search Report, issued in corresponding International Application No. PCT/CN2010/001281.

(Continued)

*Primary Examiner* — Jill Warden
*Assistant Examiner* — Benjamin Whatley
(74) *Attorney, Agent, or Firm* — Wood, Phillips, Katz, Clark & Mortimer (57) ABSTRACT

The present invention is directed to a continuous material extraction system for extracting valuable components from a material with a solvent. Specifically, the system includes an extraction tank, a solvent inlet in the upper portion of the tank, a solution inlet in the lower portion of the tank, an extraction bath for the solvent and the material, a material conveying mechanism and an ultrasonic generator.

6 Claims, 2 Drawing Sheets

(56) References Cited

FOREIGN PATENT DOCUMENTS

| | | |
|---|---|---|
| CN | 2 724 801 | 9/2005 |
| CN | 2 880 211 | 3/2007 |
| CN | 101 306 255 | 11/2008 |
| CN | 201 186 168 | 1/2009 |
| GB | 877 784 | 9/1961 |
| WO | 02/45812 | 6/2002 |

OTHER PUBLICATIONS

Written Opinion, issued in corresponding International Application No. PCT/CN2010/001281.

* cited by examiner

SYSTEM AND METHOD FOR CONTINUOUS EXTRACTION OF MATERIAL

TECHNICAL FIELD

The present invention relates to a continuous material extraction system and a method for extracting valuable components in the material by adopting the system.

BACKGROUND OF THE INVENTION

Reflux extraction is a method wherein a raw material component is extracted by using a volatile organic solvent, the leaching solution is heated and distilled, wherein the volatile organic solvent is cooled after being distilled to flow back to the extractor repeatedly for extracting the raw material, and when one cycle is completed, another begins until the valuable components are thoroughly extracted. Reflux extraction is also called heat reflux extraction and is called Soxhlet extraction in laboratories. Attributing to the solid substance therein being extracted continuously by the fresh solvent, as compared with the method for extracting useful substance by a long-term soakage of the solid in the solvent, the reflux extraction not only saves solvent but also has high extraction efficiency, and its process is relatively simple, thus it is applied widely in various circumstances in which the solid-liquid extraction is required. However, the reflux extraction still requires a relatively long period of time, and because the solvent should be volatile, it is substantially limited to organic solvents.

Ultrasonic extraction realizes solid-liquid extraction separation by reducing the acting forces between the target extract and the sample matrix through rapid mechanical vibration waves generated by piezoelectric transducers. Ultrasonic cavitation is a dynamic process in which micro-gas core cavitation bubbles in liquid vibrate by the acoustic waves, and when acoustic pressure achieves a certain value, the bubbles grow and collapse. The "cavitation" and the mechanical effect generated by the ultrasonic wave in the extraction solvent result in the formation, growth, blasting and compression of bubbles in the solution in order , as to make the solid sample disperse, increase the contact area between the sample and the extraction solvent and improve the mass transfer rate of the target substance from the solid phase to the liquid phase. The ultrasonic extraction is generally conducted at a lower temperature and under normal pressure, is safe, its operation is feasible, its maintenance is convenient, and its scope of application is wide. Therefore, it is widely used in extraction of various components in Chinese medicinal materials. However, in general, the ultrasonic extraction is the batch type extraction. To extract the target in the material completely effectively, the method of adding the solvent whose volume is far larger than that of the material, or the method of multi-separation, repeated extraction is required. The former extraction method requires adding a large amount of solvent, which greatly increases the input amount and throughput of the extraction solvent; and the latter has a complex process, which greatly increases the workload.

CN201186168 and CN101306255 disclose heat reflux extraction thickener units that include an extraction tank, a filter, a heater, an evaporator, a condenser and an oil-water separator. The units can also include a demister, a vacuum and a switching tank. These units must be fed with liquid continuously and cannot be fed with material and discharge material continuously. Hence, with respect to the flowing of the material, they are batch type extraction units.

CN2401245Y discloses spiral continuous counter-flow ultrasonic wave leaching extraction equipment which is composed of a single or a plurality of cylindrical body (bodies) in which an helical propeller or spiral propeller arranged in the axial direction is provided, wherein spiral blades are densely covered with small holes, and the object of extraction is achieved by counter flow of the material and the extraction medium, and an ultrasonic transducer is arranged in parallel on an outer wall. This patent realizes the continuous extraction of the ultrasonic extraction. However, the counter flow of the material and the extraction medium can hardly be controlled. In practice, the continuous operation can hardly be realized. Furthermore, the ultrasonic transducer is arranged on the outer wall, which may cause energy loss.

CN2582599 discloses a medium separation type continuous count current ultrasonic wave natural drug extractor. As compared with CN2401245Y, this patent is a great improvement. An extraction tube of the extractor is arranged in an ultrasonic box body, the interior of the extraction tube is filled with material, and the ultrasonic box body in the exterior of the tube is sealed and filled with water, and the aqueous medium is completely isolated from the extraction solvent in the extraction tube, which can realize the counter current extraction better. Arranging an ultrasonic transducer on the outer wall of the ultrasonic box can cause energy loss. Further, the scale production can hardly be realized, because the contact between the aqueous medium and the material cannot be assured after enlargement of the scale, which cannot realize the thorough extraction of the valuable component in the material effectively.

WO 02/45812 A2 discloses an ultrasonic reflux system for one step purification of carbon nano-material, which system is composed of parts such as a condenser, an extraction tube, a solvent flask, a heat source, an ultrasonic device box, a filtering device etc., wherein the extraction tube is immersed in the box body of an ultrasonic generator, the upper side of the extraction tube is connected with the condenser, the lateral side is connected with a flask filled with the solvent by means of a siphon tube, the material can be oxidized by feeding an oxidative gas to the extractor, by means of interaction of the reflux solvent and the ultrasonic wave, the carbon nano-material can be purified. The device is a treatment device for purification in small-sized laboratories.

An ultrasonic continuous extraction device with a helical propeller has the following limitations regardless of the direction that the liquid and solid are flowing:

1. Thorough contact between the liquid and the solid cannot be assured;
2. An overlong helical propeller is not ideal because it cannot be assured that the center of the propeller moves straight forward. Such movement can damage of the equipment and cannot assure thorough leaching of the material in a single process and thereby requiring repeating the extraction process;
3. It is not suitable for solid, hard, or high viscosity material because these materials are too dense for the helical propeller.

SUMMARY OF THE INVENTION

According to the first aspect of the present invention, a continuous material extraction system is provided for continuously extracting valuable components in the material by means of the solvent, the system comprising:

An extraction tank which is a sealed container being substantially parallelepiped, wherein in the longitudinal direction of the extraction tank, the extraction tank has a first end at which a material inlet is provided, and a second end, and a material outlet is provided at the first end or the second end; the upper portion of said extraction tank is provided with a solvent inlet, and the lower portion of said extraction tank is provided with a solution outlet;

In the longitudinal direction of said extraction tank, the lower portion of said extraction tank is provided with an extraction bath which is applied for accommodating the solvent and the material;

Wherein, in the longitudinal direction of said extraction tank, said extraction bath is provided with a material conveying mechanism and an ultrasonic generator.

In a preferred embodiment of the present invention, between said solvent inlet and said material conveying mechanism, said extraction tank is further provided with a solvent distributor for uniformly distributing solvent on said material conveying mechanism. The liquid distributor can be arranged to be adjacent to the top of the extraction tank; the two sides of the distributor are provided vertically with separating plates having the function of guiding the flowing direction of the liquid. The ultrasonic generator can be arranged on the bottom of the inner side of the extraction bath or on the inner side of the separating plates.

In a preferred embodiment of the present invention, the second end of said extraction tank is further connected with a material recycling storehouse; and said material conveying mechanism is further provided with an extension section extending toward the material recycling storehouse, wherein the height of the terminal end of the extension section is higher than that of said material conveying mechanism in said extraction bath.

In a preferred embodiment of the present invention, a low pressure flash tank for recycling the solvent, and a liquid storage tank for storing the recycled solvent are further provided, wherein the solution outlet of said extraction tank is in fluid communication with an inlet of the lower portion of said low pressure flash tank through a pipeline fluid, an outlet of the upper portion of said low pressure flash tank is in fluid communication with the inlet of the liquid storage tank through a pipeline, and the outlet of said liquid storage tank is in fluid communication with the solvent inlet of said extraction tank through a pipeline.

In a preferred embodiment of the present invention, a finishing separation tank for further recycling the solvent is also included, wherein the outlet at the bottom of said low pressure flash tank is in fluid communication with an inlet of the lower portion of said finishing separation tank by means of a pipeline, a solvent outlet of the upper portion of said finishing separation tank is in fluid communication with the inlet of said liquid storage tank by means of a pipeline, and the lower portion of said finishing separation tank is further provided with an extracted substance outlet for discharging the extracted substance.

In a preferred embodiment of the present invention, said liquid storage tank is further provided with a solvent complementary inlet for complementing solvent to the system.

In a preferred embodiment of the present invention, said material conveying mechanism comprises an endless conveyor belt and at least one driving roller and at least one driven roller surrounded by said endless conveyor belt.

In a preferred embodiment of the present invention, the upper surface of said endless conveyor belt is lower than the upper edge of said extraction bath.

In a preferred embodiment of the present invention, said material conveying mechanism further comprises an endless conveyor belt, and a driving roller and a driven roller surrounded by said endless conveyor belt;

Said endless conveyor belt comprises an upper stroke section above a connection line connecting the rotation axes of said driving roller and said driven roller, and a lower stroke section below the connection line connecting the rotation axes of said driving roller and said driven roller;

Along the overall length of said endless conveyor belt and in the length direction of said endless conveyor belt, a plurality of material carriers is arranged consecutively and spaced apart uniformly, and each of said plurality of material carriers has an open upper portion and closed lateral and bottom portions and is applied for accommodating material, and the bottom of each one of said plurality of material carriers is hinged on said endless conveyor belt around a hinge axis in a manner that it can pivot by at least 150 degrees, and said hinge axis is substantially parallel with the rotation axes of the driving roller and the driven roller.

In a preferred embodiment of the present invention, the height of the upper edge of said extraction bath is adjustable, such that the highest liquid level of the solvent in said extraction bath can only immerse said lower stroke section when the height of the upper edge of said extraction bath is adjusted to be in a low level;

The highest liquid level of the solvent in said extraction bath can immerse both said lower stroke section and said upper stroke section when the height of the upper edge of said extraction bath is adjusted to be in a high level.

In a preferred embodiment of the present invention, the hinge axis of each one of the plurality of material carriers that is hinged on said endless conveyor belt around a hinge axis in a manner that it can pivot by at least 150 degrees on said endless conveyor belt is located on the upper edge of said material carrier, such that said material carrier can be naturally kept in the carrying position in which the opening is upward due to gravity;

Each one of said plurality of material carriers is further provided with a pivoting driving device which is applied for making said material carrier rotate around its hinge axis after the extraction reaction of the material in the material carrier and when said material carrier reaches the discharging position, so as to make said material carrier be located in the discharging position in which the opening is substantially downward.

In a preferred embodiment of the present invention, the bottom of each one of said plurality of material carriers is hinged on said endless conveyor belt around the hinge axis in the manner that it can pivot by 360 degrees.

According to the second aspect of the present invention, a method of extracting valuable components in the material by the continuous material extraction system of the present invention is provided, the method including the following steps:

a) Adding material from the material inlet of the extraction tank, distributing the material uniformly on the conveyor belt of the material conveying mechanism, wherein the conveyor belt is driven by the driving roller to convey the material in the direction from the first end of the extraction tank to the second end of the extraction tank;

b) Adding solvent to the extraction tank from the solvent inlet of the extraction tank, wherein the solvent is firstly supplied to the solvent distributor and then is uniformly distributed by the solvent distributor to the conveyed material on the conveyor belt so as to extract the material;

c) Activating the ultrasonic transmitter to emit ultrasonic waves so as to reinforce and accelerate the reaction;

d) Making the solution containing the extracted substance overflow to exit the extraction bath, leave from the solution outlet of the extraction tank to the low pressure flash tank in which the solvent in the solution containing the extracted substance is recycled; and e) Transferring the remaining solution containing the extracted substance to the finishing separation tank, further recycling the solvent in the solution containing the extracted substance in the finishing separation tank, and discharging the separated extracted substance obtained after the above-mentioned two recycling of the solvent via the extracted substance outlet.

In a preferred embodiment of the present invention, the following step is further included:

g) Transferring the extracted material to the material recycling storehouse via the extension section of the material conveying mechanism.

In a preferred embodiment of the present invention, the following steps are further comprised:

h) Transferring the solvent recycled by the low pressure flash tank to the liquid storage tank and further transferring it back to the extraction tank via the solvent inlet; and i) Transferring the solvent recycled by the finishing separation tank to the liquid storage tank and further transferring it back to the extraction tank via the solvent inlet.

In a preferred embodiment of the present invention, said step of adding the solvent is conducted continuously or discontinuously.

In a preferred embodiment of the present invention, said step of activating the ultrasonic generator is conducted continuously or discontinuously.

The method of the present invention can be applied for extracting biodiesel from plant material.

The method of the present invention can be applied for extracting medicine from plant material.

The method of the present invention can further be applied for extracting health products etc. from plant material.

The method of the present invention can be applied for extracting organic chemicals from mineral raw materials such as coal etc.

DESCRIPTION OF REFERENCE NUMBERS

I Extractor
II Low pressure flash tank
III Finishing separation tank
IV Liquid storage tank
V Circulating pump
1. Extraction tank
2. Material recycling storehouse
3. Distributor
4. Separator
5. Extraction bath
6. Ultrasonic generator
7. Conveyor belt
8. Material carrier
9. Solvent inlet
10. Solution outlet
11. Material inlet
12. Cleaning port
13. Material conveying mechanism
14. Solvent complementary inlet
15. Extracted substance outlet
16. Material outlet
17. Upper edge of the extraction bath
18. Hinge axis
60. Gear
80. Discharge outlet

DETAILED DESCRIPTION OF THE EMBODIMENTS

Figure 1:
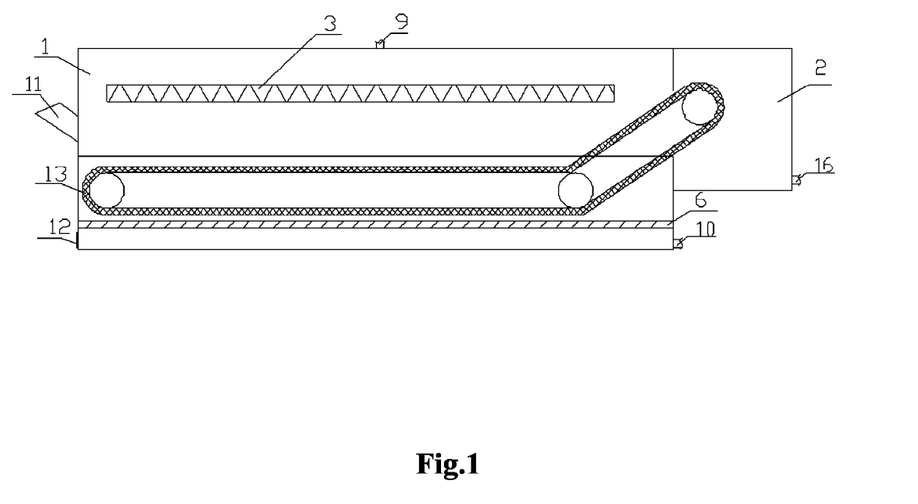
FIG. 1 is a partial sectional view of the main portions of the continuous material extraction system of the present invention viewed from a lateral side of a first embodiment of the continuous material extraction system of the present invention.

As shown in respective figures, according to a first aspect of the present invention, a continuous material extraction system is provided for continuously extracting valuable components in the material by adopting a solvent, the system comprising:

An extraction tank 1 which is a sealed container being substantially parallelepiped, wherein in the longitudinal direction (the left and right direction in FIG. 1) of the extraction tank 1, the extraction tank has a first end at which a material inlet 11 is provided, and a second end, and a material outlet is provided at the first end or the second end; the upper portion of said extraction tank is provided with a solvent inlet 9, and the lower portion of said extraction tank is provided with a solution outlet 10; In the longitudinal direction of said extraction tank 1, the lower portion of said extraction tank 1 is provided with an extraction bath 5 which is applied for accommodating the solvent and the material;

Wherein, in the longitudinal direction of said extraction tank 1, said extraction bath 5 is provided with a material conveying mechanism 13 and an ultrasonic generator 6.

Figure 2:
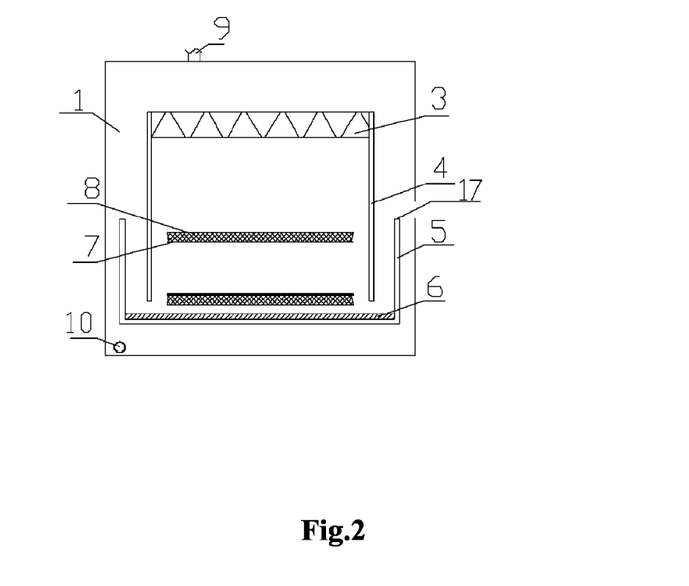
FIG. 2 is a partial sectional view of the main portions of the continuous material extraction system of the present invention viewed from an end portion of the continuous material extraction system of the present invention.

In a preferred embodiment of the present invention, between said solvent inlet 9 and said material conveying mechanism 13, said extraction tank 1 is further provided with a solvent distributor 3 for uniformly distributing solvent on said material conveying mechanism 13. Said solvent distributor 3 is arranged to be adjacent to the top of the extraction tank 1; the two sides of the solvent distributor 3 are provided vertically with separating plates 4 having the function of guiding the flowing direction of the liquid. The ultrasonic generator 6 is arranged on the bottom (as shown in FIG. 2) of the inner side of the extraction bath 1 or on the inner side (which is not shown in the figures) of the separating plates 4.

As shown in FIG. 1, in a preferred embodiment of the present invention, the second end of said extraction tank 1 is further connected with a material recycling storehouse 2; and said material conveying mechanism 13 is further provided with an extension section extending toward the material recycling storehouse 2, wherein the height of the terminal end of the extension section is higher than that of said material conveying mechanism in said extraction bath.

Figure 3:
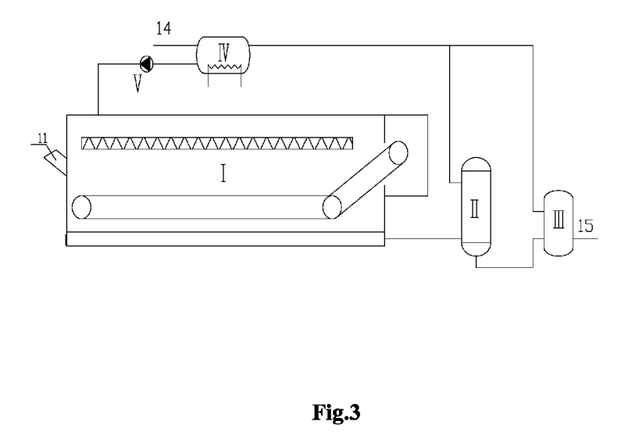
FIG. 3 is a relatively complete view of the continuous material extraction system of the present invention viewed from the visual angle of FIG. 1.

As shown in FIG. 3, in a preferred embodiment of the present invention, a low pressure flash tank II for recycling the solvent, and a liquid storage tank IV for storing the recycled solvent are further provided, wherein the solution outlet 10 of said extraction tank 1 is in fluid communication with an inlet of the lower portion of said low pressure flash tank II through a pipeline fluid, an outlet of the upper portion of said low pressure flash tank II is in fluid communication with the inlet of the liquid storage tank IV through a pipeline, and the outlet of said liquid storage tank IV is in fluid communication with the solvent inlet 9 of said extraction tank 1 through a pipeline.

In a preferred embodiment of the present invention, a finishing separation tank III for further recycling the solvent is also included, wherein the outlet at the bottom of said low pressure flash tank II is in fluid communication with an inlet of the lower portion of said finishing separation tank III by means of a pipeline, a solvent outlet of the upper portion of said finishing separation tank III is in fluid communication with an inlet of said liquid storage tank IV by means of a pipeline, and the lower portion of said finishing separation tank III is further provided with an extracted substance outlet 15 for discharging the extracted substance.

In a preferred embodiment of the present invention, said liquid storage tank IV is further provided with a solvent complementary inlet 14 for complementing solvent to the system.

As shown in FIG. 1 and FIG. 3, in a preferred embodiment of the present invention, said material conveying mechanism 13 includes an endless conveyor belt and at least one driving roller as well as at least one driven roller surrounded by said endless conveyor belt.

As shown in FIG. 2, in a preferred embodiment of the present invention, the upper surface of said endless conveyor belt is lower than the upper edge of said extraction bath.

In a preferred embodiment of the present invention, in the length direction of said endless conveyor belt, a plurality of material carriers 8 are fixed and arranged consecutively and spaced apart uniformly to make the bottoms of the material carriers 8 be fixed firmly on the conveyor belt, and each of said plurality of material carriers 8 has an open upper portion and closed lateral and bottom portions and is applied for accommodating material. Respective material carriers 8 are not interconnected, and the space between respective material carriers should ensure the smooth running of the conveyor belt. In the running process of the conveying mechanism, in the return position of the conveyor belt in the material recycling storehouse 2 (see FIG. 1 and FIG. 3), respective material carriers 8 achieve the substantially downward position subsequently, so as to pour the solid material down to the material recycling storehouse 2.

Figure 4:
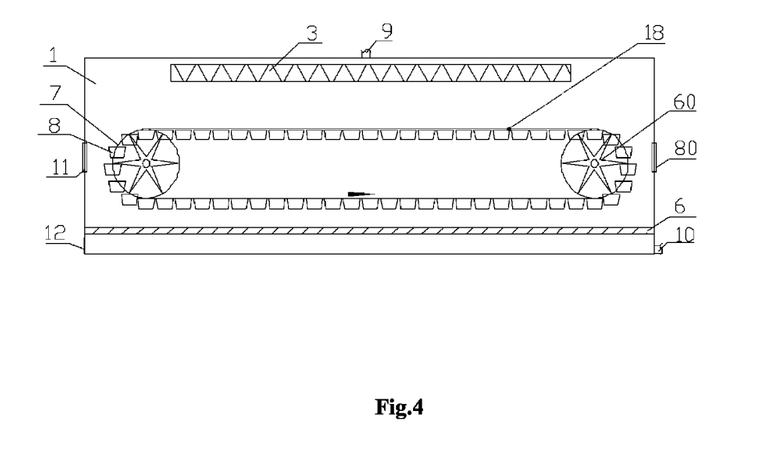
FIG. 4 is a partial sectional view of the main portions of the continuous material extraction system of the present invention viewed from a lateral side of a second embodiment of the continuous material extraction system of the present invention.

As shown in FIG. 4, in a preferred embodiment of the present invention, said material conveying mechanism comprises an endless conveyor belt, and a driving roller as well as a driven roller surrounded by said endless conveyor belt (For instance, either of the two gears denoted by the reference sign 60 in FIG. 4 can be regarded as the driving roller), and in the case that the driving roller and the driven roller are in the form of gears, said endless conveyor belt can be a chain 13 that can be engaged with the gears so as to be driven by the gear to rotate;

Said endless conveyor belt comprises an upper stroke section above a connection line connecting the rotation axes of said driving roller and said driven roller, and a lower stroke section below the connection line connecting the rotation axes of said driving roller and said driven roller;

Along the overall length of said endless conveyor belt and in the length direction of said endless conveyor belt, a plurality of material carriers 8 is arranged consecutively and spaced apart uniformly, and each of said plurality of material carriers 8 has an open upper portion and closed lateral and bottom portions and is applied for accommodating material, and the bottom of each one of said plurality of material carriers 8 is hinged on said endless conveyor belt around a hinge axis in a manner that it can pivot by at least 150 degrees, and said hinge axis is substantially parallel with the rotation axes of the driving roller and the driven roller.

In a preferred embodiment of the present invention, the height of the upper edge of said extraction bath is adjustable, such that the highest liquid level of the solvent in said extraction bath can only immerse said lower stroke section when the height of the upper edge of said extraction bath is adjusted to be in a low level; The highest liquid level of the solvent in said extraction bath can immerse both said lower stroke section and said upper stroke section when the height of the upper edge of said extraction bath is adjusted to be in a high level.

When the height of the upper edge of said extraction bath is adjusted to be in a low level to make the highest liquid level of the solvent in said extraction bath only immerse said lower stroke section, the extraction reaction can be only conducted in said lower stroke section. In this circumstance, the material is moved in one direction from the charging end (material inlet 11) of said extraction bath to the discharging end (discharge outlet 80) of said extraction bath, so as to discharge the residue of the material at the discharging end after the extraction reaction.

When the height of the upper edge of said extraction bath is adjusted to be in a high level to make the highest liquid level of the solvent in said extraction bath immerse both said lower stroke section and said upper stroke section, the extraction reaction can be conducted in two phases i.e. said lower stroke section and said upper stroke section (i.e. the whole circumference of the endless conveyor belt and thus can be called "circulating stroke"). In this circumstance, the material is moved in the direction of circumference from the charging end of said extraction bath to the opposite end of said extraction bath, and then returns from the opposite end back to the charging end, so as to discharge (at the material inlet 11 in FIG. 4) the residue of the material at the charging end after the extraction reaction.

The length (the one-way stroke or the circulating stroke) of the extraction reaction can be selected according to aspects such as the properties, processing parameters of the material which will be applied for extraction reaction and the object of extraction etc. If the above-mentioned circulating stroke is used, the extracted material can circulate at least for one circle on the overall circumference. In other words, a plurality of circles can be circulated according to processing requirements.

In a preferred embodiment of the present invention, the hinge axis of each one of the plurality of material carriers 8 that is hinged on said endless conveyor belt around a hinge axis in a manner that it can pivot by at least 150 degrees on said endless conveyor belt is located on the upper edge of said material carrier 8, such that said material carrier 8 can be naturally kept in the carrying position (the position as shown in FIG. 4) in which the opening is upward due to gravity; and Each one of said plurality of material carriers 8 is further provided with a pivoting driving device (which is not shown in the figures) which is applied for making said material carrier 8 rotate around its hinge axis after the extraction reaction of the material in the material carrier 8 and when said material carrier 8 reaches the discharging position, so as to make said material carrier 8 be located in the discharging position in which the opening is substantially downward.

In a preferred embodiment of the present invention, the bottom of each one of said plurality of material carriers 8 is hinged on said endless conveyor belt around the hinge axis in the manner that it can pivot by 360 degrees. Namely, respective material carriers 8 can rotate completely around their hinge axes. In this way, the material carrier can rotate in any rotation direction so as to make the discharging of the material be more convenient.

In the arrangement in FIG. 4, the material recycling storehouse 2 in FIG. 1 can be omitted. As a result, the length of the equipment can be shortened to reduce complexity of the equipment.

According to a second aspect of the present invention, a method of extracting valuable components in the material by the continuous material extraction system of the present invention is provided, the method including the following steps:

a) Adding material from the material inlet 10 of the extraction tank 1, distributing the material uniformly on the conveyor belt of the material conveying mechanism 13, wherein the conveyor belt is driven by the driving roller to convey the material in the direction from the first end of the extraction tank 1 to the second end of the extraction tank 1;

b) Adding solvent to the extraction tank 1 from the solvent inlet 9 of the extraction tank 1, wherein the solvent is firstly supplied to the solvent distributor 3 and then is uniformly distributed by the solvent distributor 3 to the conveyed material on the conveyor belt so as to extract the material;

c) Activating the ultrasonic transmitter 8 to emit ultrasonic waves so as to reinforce and accelerate the reaction;

d) Making the solution containing the extracted substance overflow to exit the extraction bath 5, leave from the solution outlet 10 of the extraction tank 1 to the low pressure flash tank II in which the solvent in the solution containing the extracted substance is recycled; and e) Transferring the remaining solution containing the extracted substance to the finishing separation tank III, further recycling the solvent in the solution containing the extracted substance in the finishing separation tank III, and discharging the separated extracted substance obtained after the above-mentioned two recycling of the solvent via the extracted substance outlet 15.

In a preferred embodiment of the present invention, the following step is further included:

g) Transferring the extracted material to the material recycling storehouse 2 via the extension section of the material conveying mechanism 13.

In a preferred embodiment of the present invention, the following steps are further comprised:

h) Transferring the solvent recycled by the low pressure flash tank II to the liquid storage tank IV and further transferring it back to the extraction tank 1 via the solvent inlet 9; and i) Transferring the solvent recycled by the finishing separation tank III to the liquid storage tank IV and further transferring it back to the extraction tank 1 via the solvent inlet 9.

In a preferred embodiment of the present invention, said step of adding the solvent is conducted continuously or discontinuously.

In a preferred embodiment of the present invention, said step of activating the ultrasonic generator is conducted continuously or discontinuously.

In other words, the present invention provides an extraction method and device in which the reflux is coupled with the ultrasonic wave, wherein the extractor I is provided with a material conveying mechanism 13 and an ultrasonic generator 6, the transmission mechanism portion is immersed in the liquid solvent, the solid material is driven by the transmission mechanism to pass through a liquid spraying section for reflux extraction and ultrasonic extraction; the liquid solvent containing the substance to be extracted flows out from the solution outlet 10 at the bottom of the extraction tank 1 and is sent to the upper solvent inlet 9 via the recycled solvent by vacuum distillation by means of the low pressure flash tank II through a charging pump to enter the extraction tank 1, flows into the extraction bath 5 via the distributor 3 to extract the material continuously to realize the reflux and repeated use of the solvent.

A specific process of the present invention is as follows: A solid material was sent to the material carriers 8 of the material conveying mechanism 13 through the material inlet 11, the lateral side of the material carrier 8 was made of a stainless screen material, the conveyor belt 7 (which can be in the form of a chain) and the material carrier 8 were completely immersed in the liquid solvent, after the extraction in the extraction bath 5, the liquid solvent containing the substance to be extracted overflowed from the lateral sides of the extraction bath 5 to the liquid storage section (see FIG. 2) in the lower portion of the extraction tank, the residue of the solid material was sent by the transmission device to the material recycling storehouse 2, and this process realized the continuous feeding and extraction of the material;

The liquid solvent flowed continuously from the distributor 3 to the extraction bath 5, after the solid material was extracted, the extraction liquid overflowed and exited from the extraction bath 5 to the liquid storage section and flowed out through the solution outlet 10 and entered into the low pressure flash tank II for vacuum distillation, after the distillation, over 95% of the solvent returned back to the extraction tank 1 via the liquid storage tank IV through the solvent inlet 9, dispersed by the liquid distributor 3 and sprayed to the extraction bath 5 so as to extract the material, which realized reflux extracting the material continuously by using the fresh solvent.

In addition, the solvent could be complemented to the system from the solvent complementary inlet 14 regularly so as to keep the required amount of the solvent;

The condensed extraction liquid still containing less than 5% of the solvent entered into the finishing separation tank III from the lower portion of the flash tank II, and after a further separation, extracted substance was obtained, and the extracted substance was transferred out of the system from the extracted substance outlet 15;

The bottom of the extraction bath 5 was provided with the ultrasonic generator 6, wherein at the time of reflux extracting the material by the solvent, the ultrasonic extraction was conducted to the solid material via ultrasonic wave, the liquid solvent being taken as the medium of the ultrasonic wave, so as to generate the "Cavitation Effect" to reinforce the extraction strength and shorten the extraction time.

The present invention may be used in industries, including but not limited to, chemical, Chinese medical, and food industries. The solid material can be any solid material used in the chemical processing, such as plants, lignins, coal or other mineral materials. The extraction can be conducted under normal pressure. The solvent used can be any liquid phase medium that can be used for solid material extraction such as various organic solvents and combinations thereof, water, water solution etc. The extraction temperature can vary from ambient temperature to the boiling temperature of the solvent according to different processes.

In an embodiment of the present invention, the ultrasonic generator can be activated intermittently to reflux extracting the material for a certain time, and then the ultrasonic wave and the reflux extraction are made to act simultaneously; As other embodiments of the present invention, the reflux liquid can be controlled, the solvent is fed to the extractor at intervals to conduct the ultrasonic extraction continuously, or the ultrasonic wave and the reflux liquid is activated and stopped at the same time or at intervals.

Besides, the present invention can be carried out by adopting the following various combined means:

A) Recycling the solvent from the low pressure flash tank II and the finishing separation tank III, and transferring the recycled solvent to the liquid storage tank IV, and further making the solvent return back the extraction tank 1 via the solvent inlet 9 (the steps h and i), i.e. making the recycled solvent flow back for being put into use over again, and continuously activating the ultrasonic generator;

B) Making the recycled solvent flow back for being put into use over again and discontinuously (intermittently) activating the ultrasonic generator;

C) Not using the recycled solvent (i.e. only using new solvent) and continuously activating the ultrasonic generator;

D) Not using the recycled solvent (i.e. only using new solvent) and discontinuously (intermittently) activating the ultrasonic generator;

Adopting the reflux extraction facilitates realizing continuously extracting the material, adopting the ultrasonic extraction can shorten the extraction time, and coupling the reflux extraction and the ultrasonic extraction can combine the advantages of the two extraction manners, not only can realize continuous and effective extraction but also can shorten the extraction time and improve the extraction efficiency. Adopting the transmission parts, can realize feeding the material continuously, coupling the reflux and the ultrasonic wave, conducting continuous extraction to the material, filling the extraction bath with the circulated solvent can increase the using efficiency of the solvent and reduce the heating energy.

EXAMPLE 1

Extracting Biodiesel from Plant Material

Frozen and dried algae powder was sent to the material carrier on the conveyor belt 7 by a feed hopper continuously. Cyclohexane at 81° C. was fed and the switches of the ultrasonic wave and the distributor were simultaneously opened, the running speed of the conveyor belt ensured the material stayed in the spraying region for 20 mins, the extraction liquid in the lower portion entered into the low pressure flash tank, the distilled Cyclohexane entered into the liquid storage tank, the temperature of the Cyclohexane was kept at 18° C. and was pumped by the circulating pump from the liquid storage tank to the distributor of the extraction tank, the main component of the condensed extraction liquid was grease, and the biodiesel can be obtained through ester exchange treatment.

EXAMPLE 2

Extracting Medicine from Plant Material

Flos Sophora was crushed to have a diameter less than 0.3 mm, the crushed Flos Sophora was transferred to the material carrier on the conveyor belt by means of a feed hopper, the temperature of water for extraction was adjusted to 60° C., the hot water was continuously fed by the distributor, the switch of the ultrasonic wave was turned on regularly at 5-minute intervals, the running speed of the conveyor belt should ensure that the material stay in the spraying region for 10 minutes, the extraction liquid in the lower portion entered into the low pressure flash tank, the distilled low pressure water vapor entered into the liquid storage tank and was pumped by a circulating pump from the liquid storage tank to the distributor of the extraction tank, and the condensed extraction liquid was further dried so as to obtain Rutin after impurity removal.

EXAMPLE 3

Extracting Health Products etc. from Plant Material

Soybeans crushed to have a diameter less than 0.5 mm were fed to the material carriers on the conveyor 7 by a feed hopper, the extraction bath was filled with 95% Ethanol of 80° C., the ultrasonic generator was activated, extracting the material in the extraction bath for 40 minutes, the valve at the entrance of the distributor was opened at 40-minute intervals, the extraction liquid in the extraction bath was replaced with the solvent in the liquid storage tank, the extraction liquid entered into the flash tank so as to be condensed, the soybeans entered into the material recycling storehouse so as to be compressed, and the liquid portion also entered into the flash tank so as to be condensed, the distilled Ethanol entered into the liquid storage tank, the condensed extraction liquid was the soybeans' extracted substance containing isoflavone and could be regarded as health product or medicine after further processing.

EXAMPLE 4

Extracting Motan Wax from Lignite

Lignite containing wax and crushed to have a diameter of less than 0.3 mm was fed continuously to the material carriers 8 on the conveyor 7 by means of a feed hopper, the conveyor belt was in the second preferred form (as shown in FIG. 4), i.e. the form in which the material carriers 8 are connected with the conveyor 7 by means of hinge axes, the height of the extraction bath's lateral side was such that both the upper stroke and the lower stroke was immersed in the solvent, the extraction bath was filled with Benzene of 81° C. which was fed to the extractor continuously by the distributor, the ultrasonic generator was activated, the time period that the lignite passes through one cycling stroke was 40 minutes, the extraction liquid in the lower portion entered into the flash tank so as to be condensed, the solvent returned back to the liquid storage tank so as to be heated and then entered into the extraction tank again for extraction, the condensed extracted substance containing a little solvent further entered into the finishing separation tank so as to be further dried and shaped so as to obtain the product motan wax; and after extraction, the remaining lignite entered into the material recycling storehouse so as to be heated and dried and be discharged from the extraction system after the solvent was recycled.

Categories of the raw materials in respective Examples mentioned above and the target extracted substance extracted therefrom are only examples and are not limited. A person skilled in the art, through the teaching of the present invention, can use the method and system of the present invention to extract different extracted substance from the raw materials of other categories.

Significant Characteristics and Advantages of the Present Invention

Arranging the material conveying mechanism in the extraction tank realizes the continuous extraction from the aspect of either the solid material or the solvent;

Arranging the ultrasonic generator in the extractor makes the ultrasonic extraction conducted at the same time of conducting the reflux extraction, which increases strength of the solid-liquid extraction, shortens the extraction time, improves the extraction efficiency, facilitates the thorough extraction and avoids the extraction being influenced by solubility of the target product in the extraction solvent;

The reflux extraction and the ultrasonic extraction can be combined optionally and are not limited to be activated continuously and simultaneously;

Either the extraction under normal pressure or the extraction at low temperature or normal temperature can be conducted.

The temperature of the extraction solvent can vary within the scope from the normal temperature to the boiling temperature of the solvent according to different processing.

In addition, compared to with the ultrasonic continuous extraction devices with the spiral propellers , the present invention has the following advantages:

1. Thorough contact between the liquid and the solid can be ensured; paragraph:
2. The material is extracted thoroughly after one pass.
3. It can process solid, hard, and high viscosity materials.

The invention claimed is:

1. A continuous material extraction system for continuously extracting valuable components from a solid material of diameter of 0.5 mm or less by means of a liquid solvent of temperature of 60° C. or higher, the system comprising:
    an extraction tank which is a sealed container being substantially parallelepiped, wherein in the longitudinal direction of the extraction tank, the extraction tank has a first end at which a material inlet is provided, and a second end, and a material outlet is provided at the first end or the second end;
    the upper portion of said extraction tank is provided with a solvent inlet, and the lower portion of said extraction tank is provided with a solution outlet;
    in the longitudinal direction of said extraction tank, the lower portion of said extraction tank is provided with an extraction bath for accommodating the solvent and the material,
    wherein said extraction bath is provided with one material conveying mechanism, which comprises one endless conveyor belt, and at least one driving roller as well as at least one driven roller surrounded by said endless conveyor belt, and an ultrasonic generator;
    wherein between said solvent inlet and said material conveying mechanism, said extraction tank is further provided with a solvent distributor for uniformly distributing solvent on said material conveying mechanism, the solvent distributor is arranged to be adjacent to the top of the extraction tank;
    wherein two sides of the distributor are provided with vertical separating plates having the function of guiding the flowing direction of the liquid;
    wherein said ultrasonic generator is arranged on the bottom of the inner side of the extraction bath;
    wherein a low pressure flash tank for recycling the solvent, and a liquid storage tank for storing the recycled solvent are further provided, wherein the solution outlet of said extraction tank is in fluid communication with an inlet of the lower portion of said low pressure flash tank through a pipeline, an outlet of the upper portion of said low pressure flash tank is in fluid communication with an inlet of the liquid storage tank through a pipeline, and an outlet of said liquid storage tank is in fluid communication with the solvent inlet of said extraction tank through a pipeline;
    wherein the material conveying mechanism is immersed in the liquid solvent, and the solid material is driven by the material conveying mechanism to pass a liquid spraying section comprising the solvent distributor for reflux extraction and ultrasonic extraction for 5-40 minutes;
    wherein the liquid solvent containing extracted substance flows out from the solution outlet and is sent to the solvent inlet after vacuum distillation by means of said low pressure flash tank and flows into the extraction bath via said distributor to continuously extract the material;
    wherein the second end of said extraction tank is further connected with a material recycling storehouse;
    said material conveying mechanism is further provided with an extension section extending toward the material recycling storehouse, wherein the vertical height of a terminal end of the extension section is higher than that of said material conveying mechanism in said extraction bath;
    wherein a finishing separation tank for further recycling the solvent is also included, wherein an outlet at the bottom of said low pressure flash tank is in fluid communication with an inlet of the lower portion of said finishing separation tank by means of a pipeline, a solvent outlet of the upper portion of said finishing separation tank is in fluid communication with the inlet of said liquid storage tank by means of a pipeline, and the lower portion of said finishing separation tank is further provided with an extracted substance outlet for discharging the extracted substance;
    wherein along the overall length of said endless conveyor belt and in the length direction of said endless conveyor belt, a plurality of material carriers are .s arranged consecutively and uniformly spaced apart, and each of said plurality of material carriers has an open upper portion and is made of a screen material, and each one of said plurality of material carriers is hinged on said endless conveyor belt around a hinge axis in a manner that it can pivot by at least 150 degrees, and said hinge axis is substantially parallel with the rotation axes of the driving roller and the driven roller; and
    wherein said liquid storage tank is further provided with a complementary inlet for complementing solvent to the system.

2. The continuous material extraction system according to claim 1, characterized in that the bottom of each one of said plurality of material carriers is hinged on said endless conveyor belt around the hinge axis in the manner that it can pivot by 360 degrees.

3. A method of extracting valuable components in a material by using the continuous material extraction system according to claim 1, the method including the following steps:
    a) adding material of diameter of 0.5 mm or less from the material inlet of the extraction tank, distributing the material uniformly on the conveyor belt of the material conveying mechanism,
    wherein the conveyor belt is driven by the driving roller to convey the material in the direction from the first end of the extraction tank to the second end of the extraction tank;
    b) adding solvent of temperature of 60° C. or higher to the extraction tank from the solvent inlet of the extraction tank, wherein the solvent is firstly supplied to the solvent distributor and then is uniformly distributed by the solvent distributor to the conveyed material on the conveyor belt so as to extract the material;
    c) activating the ultrasonic transmitter to emit ultrasonic waves for reflux extraction and ultrasonic extraction at the same time for 5-40 minutes;

d) making the solution consisting of said liquid solvent and extracted substance overflow to exit the extraction bath, leave from the solution outlet of the extraction tank to the low pressure flash tank in which the solvent in the solution is recycled;
e) transferring the remaining solution in the extraction bath to the finishing separation tank, further recycling the solvent in the solution in the finishing separation tank, and discharging the separated extracted substance obtained after the recycling within the low pressure flash tank and the recycling taking place in the finishing separation tank of the solvent via the extracted substance outlet;
f) transferring the extracted material to the material recycling storehouse via the extension section of the material conveying mechanism;
g) transferring the solvent recycled by the low pressure flash tank to the liquid storage tank and further transferring it back to the extraction tank via the solvent inlet; and
h) transferring solvent recycled by the finishing separation tank to the liquid storage tank and further transferring it back to the extraction tank via the solvent inlet.

4. The method according to claim 3, characterized in that said step of adding the solvent is conducted continuously or discontinuously.

5. The method according to claim 3, characterized in that said step of activating the ultrasonic generator is conducted continuously or discontinuously.

6. The method according to claim 3, characterized in that said method is applied for extracting biodiesel, medicine or health products from plant material or extracting organic chemicals from mineral raw materials.

* * * * *